No. 613,136. H. FRENCH. Patented Oct. 25, 1898.
BREAD TOASTER.
(Application filed Mar. 8, 1898.)
(No Model.)
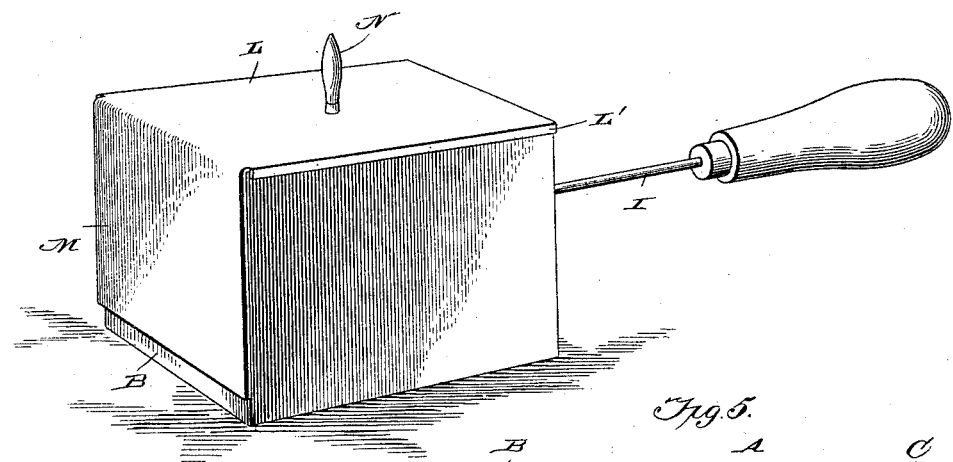
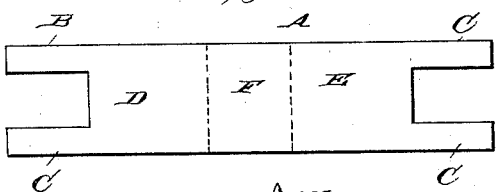
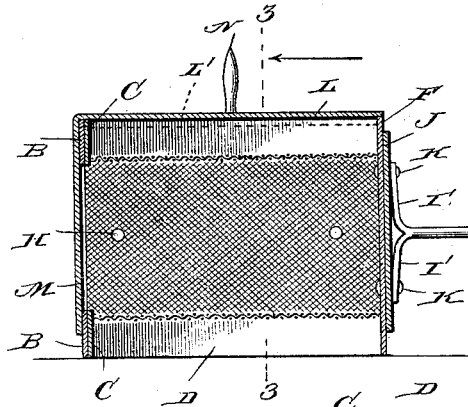
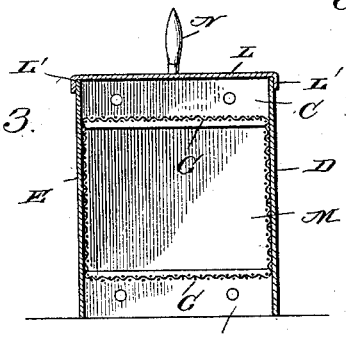
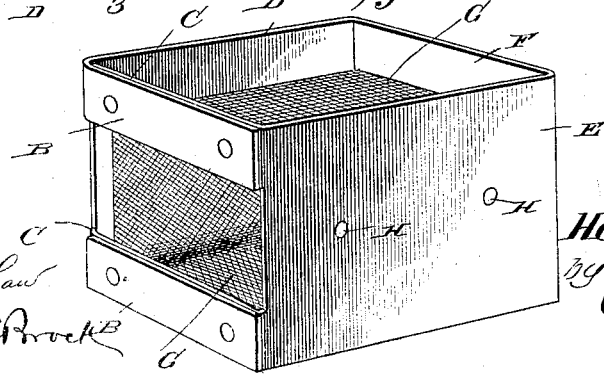
Inventor
Henry French,
Witnesses

UNITED STATES PATENT OFFICE.

HENRY FRENCH, OF ELKHART, INDIANA.

BREAD-TOASTER.

SPECIFICATION forming part of Letters Patent No. 613,136, dated October 25, 1898.

Application filed March 8, 1898. Serial No. 673,034. (No model.)

*To all whom it may concern:*

Be it known that I, HENRY FRENCH, a citizen of the United States, residing at Elkhart, in the county of Elkhart and State of Indiana, have invented a new and useful Bread-Toaster, of which the following is a specification.

My invention relates to certain improvements in implements for toasting bread and for like uses, the object of the invention being to provide a simple, cheap, durable, and reliable device of this class.

With this object in view my invention consists, primarily, in a bread-toaster composed of a sheet-metal box without top or bottom and having the central portion of one end cut away, provided with an interior cage of wire-netting, access to which is had through the cut-away end of the box, the netting being smaller than the box and arranged therein to leave a space within the box above and below the netting.

My invention further consists in a bread-toaster constructed as before described provided with a lid for closing the top and open end thereof, consisting of a sheet of metal bent to form an overhanging end flange to close the open end of the box, the main body being adapted to rest upon the open top of the box and provided with narrow depending flanges to prevent its lateral displacement.

My invention further consists in the improved construction, arrangement, and combination of parts hereinafter fully described, and afterward specifically pointed out in the appended claims.

In order to enable others skilled in the art to which my invention most nearly appertains to make and use the same, I will now proceed to describe its construction and operation, reference being had to the accompanying drawings, forming part of this specification, in which—

Figure 1 is a perspective view illustrating my invention in position for practical operation. Fig. 2 is a longitudinal sectional view therethrough with the handle broken away. Fig. 3 is a transverse sectional view on the line 3 3 of Fig. 2. Fig. 4 is a detail perspective view illustrating the main body of the toaster with the lid and handle omitted. Fig. 5 is a diagrammatic view of the sheet-metal blank of which the body of the toaster is formed.

Like letters of reference mark the same parts wherever they occur in the various figures of the drawings.

Referring to the drawings by letters, A (see Fig. 5) indicates the blank from which the body of the toaster is formed. This blank is bent into rectangular form, with the end strips B and C overlapping and riveted together, forming the outer end of the main body, the central portion thereof for about one-half the height being omitted, the balance of the blank forming the sides D and E and the end F.

Within the body or box is centrally secured an open-ended woven-wire cage G, of the same horizontal dimensions as the box, but of only about one-half of its height, more or less. This cage is secured to the body by means of rivets H, one end of the cage being closed against the end F of the box and the other end being open and registering with the opening in the end of the box. A handle I, of any ordinary construction, is secured to the end of the box, the joint between the handle and the box being strengthened by a reinforcing-strip J, to which the forked inner ends I' of the handle are secured by bolts or rivets K.

The lid of my improved toaster is formed of a single sheet of metal bent to provide a top L to cover the open top of the box, an overhanging end flange M to close the open end of the box and cage, and narrow edge flanges L', depending from the top L, to prevent lateral displacement. A suitable handle N is secured to the top L to facilitate its manipulation.

The construction of my invention will be readily understood from the foregoing description, and its operation may be described as follows: The bread to be toasted is passed through the open end of the box into the cage G. The lid is now placed in position as indicated in Fig. 1, entirely inclosing the open top and end of the box, but leaving the bottom open. The toaster is now placed upon the top of a hot stove, which will bring the bread resting upon the bottom of the cage quite close to the heated surface of the stove, but removed from actual contact therewith, all the heat arising from the portion of the stove covered by the box being confined by the lid, with its overhanging flange to close the end of the box within the box and facilitating the operation. The lid may be removed at any time to inspect the contents of the cage, and when it is found that the bread has been sufficiently toasted upon its lower side the box, with the lid removed therefrom, is reversed in position upon the stove, causing the bread to drop to the opposite side of the cage, with its former upper surface resting thereon in close proximity to the top of the stove. The lid is now placed in position and the operation of toasting finished.

By means of this invention bread may be toasted regularly and thoroughly without any danger whatever of burning or charring it and without liability of burning the hands of the user.

While I have described my invention as a bread-toaster, it will of course be understood from the foregoing description that it will be applicable to many other uses as a cooking utensil, and while I have illustrated and described the best means for carrying out my invention I do not wish to be understood as restricting myself to the exact details of construction shown, but hold that any slight changes or variations such as might suggest themselves to the ordinary mechanic would properly fall within the limit and scope of my invention.

Having thus fully described my invention, what I claim as new, and desire to secure by Letters Patent of the United States, is—

1. A bread-toaster, the main body of which is provided with closed sides, one closed end and an end having the central portion cut away or open, in combination with a wire cage, of the same length as the body of the toaster but of less height, secured within the box in position to leave an open space above and below it, having one end closed by the closed end of the box and the other end registering with the opening in the open end of the box, substantially as described.

2. The combination in a bread-toaster, of a box or body consisting of a single sheet of metal provided with edge strips projecting longitudinally at each end, bent to form two closed sides and a closed end, the opposite end being formed by overlapping the end strips and riveting them together, leaving an opening between the top and bottom strips, and an open-ended wire cage secured within the box, having one of its ends closed against the solid end of the box and the other registering with the opening in the open end of the box, substantially as described.

3. The combination in a bread-toaster, of a main body having closed sides, one closed end, and one end with the central portion cut away, a wire cage, of less height than the body secured therein with one of its open ends registering with the opening in the end of the box, and the lid, adapted to cover the open top of the box, provided with edge flanges to prevent lateral displacement, and a depending end flange to close the open end of the box or body, substantially as described.

HENRY FRENCH.

Witnesses:
JOHN C. FELTERHOFF,
JOHN H. SHUEY.